United States Patent [19]

Van Sluys

[11] Patent Number: 4,661,944
[45] Date of Patent: Apr. 28, 1987

[54] OPTICAL RECORDING/PLAYBACK APPARATUS HAVING A FOCUSING CONTROL SYSTEM WITH REDUCED SPOT-OFFSET SENSITIVITY

[75] Inventor: Robert N. J. Van Sluys, Eindhoven, Netherlands

[73] Assignee: U.S. Philips Corporation, New York, N.Y.

[21] Appl. No.: 619,430

[22] Filed: Jun. 11, 1984

[30] Foreign Application Priority Data

Mar. 2, 1984 [NL] Netherlands ......................... 8400674

[51] Int. Cl.$^4$ .......................... G11B 7/12; G11B 21/00; G11B 7/095
[52] U.S. Cl. ....................................... 369/44; 369/46; 250/202
[58] Field of Search ............................. 369/44, 45, 46; 250/201, 201 DF, 202

[56] References Cited

U.S. PATENT DOCUMENTS

| | | | |
|---|---|---|---|
| 4,123,652 | 10/1978 | Bouwhuis | 369/45 |
| 4,163,149 | 7/1979 | Sawano et al. | 369/45 |
| 4,293,944 | 10/1981 | Izumuta et al. | 369/45 |
| 4,467,462 | 8/1984 | Shibata | 369/45 |
| 4,544,838 | 10/1985 | Musha et al. | 369/44 |

FOREIGN PATENT DOCUMENTS 0125241  7/1983  Japan ...................................... 369/46

Primary Examiner—Raymond F. Cardillo
Assistant Examiner—Hao T. Nguyen
Attorney, Agent, or Firm—Robert T. Mayer; Algy Tamoshunas

[57] ABSTRACT

The disclosed apparatus for recording and/or reading information in or from a track of a radiation-reflecting record carrier by means of a light beam includes an objective system for focusing the light beam so as to form a light spot on the record carrier in dependence on a control signal ($S_f$). The control signal is generated by a focusing-error detection system having an astigmatic element and four detectors ($D_1$ to $D_4$). The output signals $S_1$ to $S_4$ of the four detectors are combined in an electric circuit arranged to produce a control signal satisfying the formula:

$$S_f = \alpha \left[ \frac{S_1 - S_4}{S_1 + S_4} + \frac{S_3 - S_2}{S_3 + S_2} \right]$$

This control signal drastically reduces the influence on the focusing of offset of the light spot on the four detectors.

7 Claims, 8 Drawing Figures

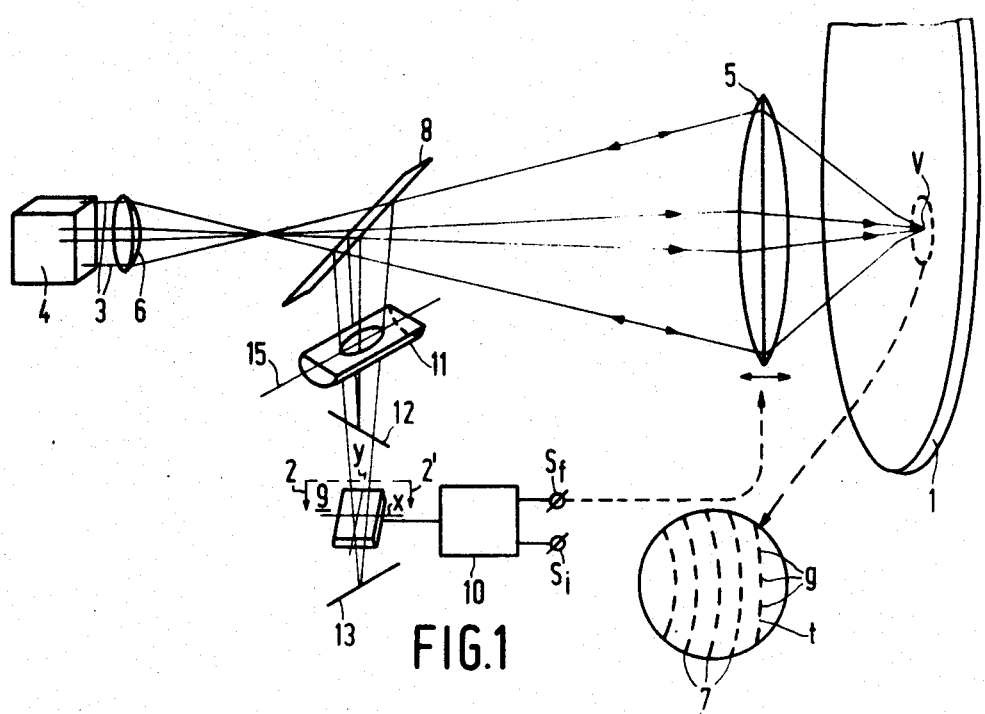
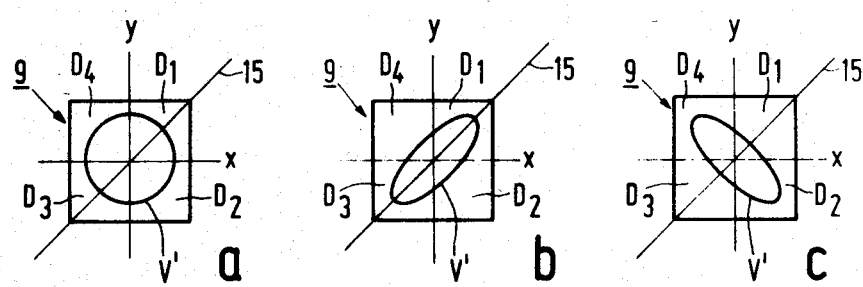
FIG.2
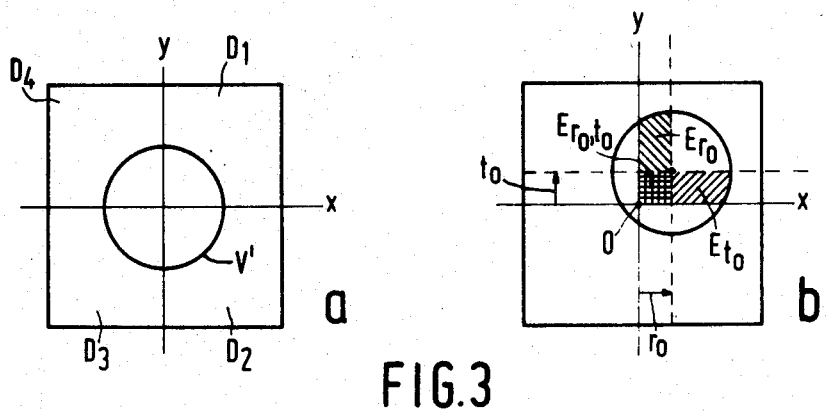
FIG.3

OPTICAL RECORDING/PLAYBACK APPARATUS HAVING A FOCUSING CONTROL SYSTEM WITH REDUCED SPOT-OFFSET SENSITIVITY

The invention relates to an apparatus for recording and/or reading information in/from a track of a radiation-reflecting record carrier by means of a light beam which is incident on the record carrier, which apparatus comprises:

a light source for producing a light beam, an objective system for focusing the light beam so as to form a light spot on the record carrier depending on a control signal and for directing the reflected light beam towards a focusing-error detection system which comprises an astigmatic element and light-sensitive detector means, which means comprise four detectors which adjoin each other and which are each disposed in a quadrant of a system or orthogonal axes, which axes extend at angles of at least substantially 45° to the astigmatic focal lines of the astigmatic element, and means for deriving a control signal, which means have an input which is coupled to the detector means to receive the output signals from the four detectors and an output which is coupled to the objective system to supply the control signal. Such apparatus is disclosed in Netherlands Patent Application No. 77.03.076, which corresponds to abandoned U.S. application Ser. No. 798,500, filed Mar. 22, 1977. It has been found that the focusing system in such an apparatus sometimes fails to operate correctly. It is the object of the invention to provide an apparatus in which the focusing system operates more reliably. According to the invention, the apparatus is characterized in that, when an index m (m being an integer from 1 to 4) is assigned to the four detectors $D_m$ in a clockwise sense, the means for deriving a control signal are constructed to derive a control signal $S_f$ from the output signals $S_m$ of the four detectors, which control signal satisfies the formula $$S_f = \alpha \left[ \frac{S_1 - S_4}{S_1 + S_4} + \frac{S_3 - S_2}{S_3 + S_2} \right]$$

where $\alpha$ is a constant. This feature of the invention is based on the recognition of the fact that the focusing system may fail to operate correctly because the light spot formed on the four detectors by the reflected light beam is not always positioned exactly symmetrically relative to the system of axis and the four detectors. This non-symmetrical position (also referred to as spot-offset) is caused, for example, by the tilting of the mirror for the radial or tangential tracking. As a result of this spot-offset, an erroneous control signal is derived from the output signals of the four detectors, so that the light beam is not focused accurately on the record carrier by the objective system. According to the invention the means for deriving the control signal are constructed so that a control signal is obtained which is less sensitive to a non-symmetrical positioning of the light spot on the four detectors. Consequently the focusing of the light spot on the record carrier by the objective system can be improved.

Preferably, the constant $\alpha$ will be selected to equal 0.5 because the sensitivity of the focusing-error detection system around the "in focus" condition will then be the same as in the apparatus which is commercially available from Philips under the name of "Laser Vision Player such as Philips model number VLP720 or VLP830".

The step in accordance with the invention also has the advantage that during manufacture of the apparatus the detector means may be adjusted less accurately, so that the apparatus can be cheaper to make.

An embodiment of the invention may be characterized in that an output of the first detector is coupled to a first input of a first and a second signal-combination unit. An output of the fourth detector is coupled to a second input of the first and the second signal-combination unit. An output of the third detector is coupled to a first input of a third and a fourth signal-combination unit and an output of the second detector is coupled to a second input of the third and the fourth signal-combination unit. An output of the first and the second signal-combination unit is coupled to a first and a second input, respectively, of a first divider means, an output of the third and the fourth signal-combination unit is coupled to a first and a second input, respectively, of a second divider means, and an output of the first and the second divider means is coupled to a first and a second input respectively of a fifth signal-combination unit. The embodiment is characterized further in that the second inputs of the first and the third signal-combination unit are inverting inputs and the other inputs of all the signal-combination units are non-inverting inputs. In this way it is possible to derive the control signal.

According to the invention the apparatus may be characterized further in that the two pairs of detectors, i.e. the first and the fourth detector and the second and the third detector respectively, are so selected that that axis of the system of axes which extends between the pairs corresponds to the direction of the anticipated maximum offset of the reflected light beam which is incident on the detector means. Since the output signals of the detectors are combined in pairs, i.e. the output signals of the first and the fourth detector are combined and those of the second and the third detector are combined, a deviation of the light spot relative to the origin of the system of axes in a direction corresponding to one axis (namely the axis which extends between the pairs) has a smaller influence on the control signal than a deviation along the other axis. Preferably, the axis which extends between the pairs is made to coincide with said direction in which the maximum offset of the light spot is anticipated. In this way the influence of this offset on the control signal is minimized.

In an apparatus comprising positioning means for positioning the light beam on the record carrier, which means comprise a first pivotal mirror for the radial tracking and a second pivotal mirror for the tangential tracking, the direction of the anticipated maximum offset of the reflected light beam which is incident on the detector means corresponds to the direction of the light-beam offset caused by tilting of that mirror which is disposed farther from the objective system.

Such an apparatus comprising a mirror for radial tracking and a mirror for tangential tracking is described in Netherlands Patent Application No. 74.02.169 which corresponds to U.S. Pat. No. 3,978,278. The mirror for the radial tracking is tilted to position the light spot on the track centre in a direction perpendicular to the track direction and the mirror for tangential tracking is tilted to position the light spot in the track direction.

In an apparatus which is commercially available from the applicant under the name of "Laser Vision Player" the mirror which is disposed farther from the objective system is the radial tracking mirror.

The invention will now be described in more detail, by way of example, with reference to the drawings. In the drawings:

FIG. 1 shows a recording and/or read apparatus in accordance with the invention, FIGS. 2a, 2b and 2c show how the shape of the spot formed on the detector means varies as a function of the focusing.

FIG. 3a shows the spot without an offset and FIG. 3b shows the spot with an offset.

Figure 4:
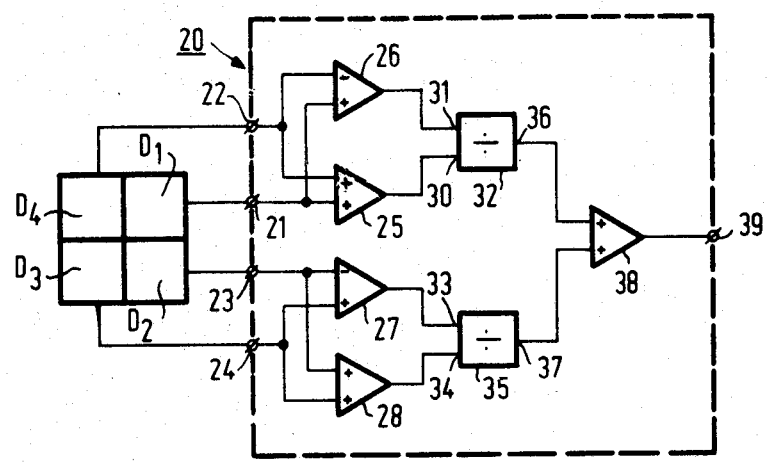
FIG. 4 shows a first example.

FIG. 1 shows a disc-shaped record carrier 1. The information structure is, for example, a phase structure and comprises a multitude of concentric or quasi-concentric tracks 7. The tracks ae comprised of consecutive areas g and intermediate areas t. The areas may be situated for example at a different depth in the record carrier than the intermediate areas. The information may be, for example a (color) television program, but alternatively it may be other information such as a large number of different images or digital information.

The record carrier is illuminated with a light beam 3 produced by a light source 4, for example a laser. An objective system, which for simplicity is represented as a single lens 5, focuses the light beam so as to form a light spot V on the surface of the tracks 7. The focal length of the auxiliary lens 6 has been selected in such a way that the pupil of the objective system is filled adequately. The light beam is reflected by the record carrier and during reading, when the record carrier rotates relative to the objective system, it is modulated in conformity with the information stored in a track portion to be read. In order to separate the non-reflected (the unmodulated) and the reflected (modulated) light beam a beam splitter 8, for example a semi-transparent mirror, is arranged in the light path. The beam splitter directs the reflected light beam to light-sensitive detector means 9. The detector means is connected to an electronic circuit 10 which generates a high-frequency information signal $S_i$ and, as will be explained hereinfter, a focusing signal $S_f$ of a lower frequency.

For the detection of focusing errors, an astigmatic element is arranged in the radiation path between the beam splitter 8 and detector 9. As is shown in FIG. 1, the astigmatic element may be a cylindrical lens. The astigmatism can also be obtained in a different way, for example, by means of a planar, transparent plate arranged obliquely in the beam or by means of a lens which is tilted relative to the beam. Instead of one focus an astigmatic system has two astigmatic focal lines which occupy different axial positions and which extend perpendicularly to one another. Thus, the objective system and the cylindrical lens ensure that the light spot V has two associated focal lines 12 and 13. The light-sensitive detector 9 is now arranged in a plane which, viewed along the optical axis, extends between the lines 12 and 13, suitably at a location where the dimensions in two mutually perpendicular directions of the focal lines associated with the light spot V are equal with an optimum accuracy when the focusing is correct.

In order to determine the shape of the spot V' and consequently the degree of focusing, the detector means 9 comprise four detectors which are disposed in the four quadrants of an X-Y coordinate system. FIGS. 2a, 2b and 2c are views, taken on the line 2, 2' in FIG. 1, of the four detectors $D_1$, $D_2$, $D_3$ and $D_4$ on which the different shapes of the spot V' are projected for different values of the distance between the objective system and the plane containing the tracks. The X-axis and the Y-axis extend at angles of 45° to the axis 15 of the cylindrical lens, i.e. to the astigmatic focal lines 12 and 13, the X-axis now extending parallel to the effective track direction.

FIG. 2a shows the situation in which the distance between the objective system and the plane of the tracks is correct. If this distance is too large the focal lines 12 and 13 will be situated closer to the cylindrical lens 11. The detector means 9 are then disposed closer to the focal line 13 then to the focal line 12. The image spot V' then has a shape as shown in FIG. 2b. If the distance between the objective system and the plane of the tracks is too small the focal lines 12 and 13 will be situated farther from the cylindrical lens and the focal line 12 is then situated closer to the detector means 9 than the focal line 13. The image spot V' then has a shape as shown in FIG. 2c.

If the signals supplied by the detectors $D_1$, $D_2$, $D_3$ and $D_4$ are $S_1$, $S_2$, $S_3$ and $S_4$ respectively, the focusing-error signal $S_f$ in commercially available Philips "Laser Vision Player" is given by:

$$S_f = \frac{(S_1 + S_3) - (S_2 + S_4)}{S_1 + S_2 + S_3 + S_4} \quad (1)$$

It will be evident that in the situation shown in FIG. 2a, $S_1+S_3=S_2+S_4$ and hence $S_f=0$. For the situations shown in FIG. 2b and in FIG. 2c, $S_f$ is negative and positive respectively. By adding the signals $S_1$ and $S_3$ to each other and adding the signals $S_2$ and $S_4$ to each other and by subtracting the resulting sum signals from one another an unambiguous focusing-error signal is obtained. This signal can be processed electronically in a manner known per se to form a focusing-control signal by means of which the focusing of the objective system can be corrected, for example by moving the objective system relative to the plane of the tracks by means of a moving coil.

FIG. 3a again shows the light spot V' on the four detectors for the case where the light spot V is focused exactly on the record carrier by the objective system. The detector signals $S_1$ to $S_4$ are now all, for example, $I_O$. In the case of a focusing error, the deformation of the light spot in a diagonal sense gives rise to the following signals:

$$S_1 = S_3 = I_O + \delta I$$

$$S_2 = S_4 = I_O - \delta I$$

$$(2)$$

so that the focusing-error signal in accordance with equation (1) becomes $$S_f = \delta I / I_O \quad (3)$$

Now the situation shown in FIG. 3b will be considered in which the light spot is in an asymmetrical position relative to the origin O of the system of axis owing to a displacement $r_O$ and $t_O$ along the X-axis and the Y-axis respectively. Such a displacement of the spot (or spot-offset) disturbs the relationship between the focusing-error signal $S_f$ and the degree of focusing on the record carrier, as will become apparent from the following. Although the light spot is circular, which means that the light beam is exactly "in focus", the focusing-error signal $S_f$ will be found to differ from zero.

If the detector signals $S_1$ to $S_4$ are written as:

$$S_1 = I_0 + E_{r0} + E_{t0} + E_{r0, t0} \quad (4)$$
$$S_2 = I_0 + E_{r0} - E_{t0} - E_{r0, t0}$$
$$S_3 = I_0 - E_{r0} - E_{t0} + E_{r0, t0}$$
$$S_4 = I_0 - E_{r0} + E_{t0} - E_{r0, t0}$$

where $E_{r_O}$ is the constribution to a detector signal corresponding to the light intensity on the area indicated by the lines which extend from the bottom left to the top right, $E_{t_O}$ is the contribution to a detector signal corresponding to the light intensity incident on the area indicated by the lines which extend from the bottom right to the top left, and $E_{r_O, t_O}$ is the contribution to a detector signal corresponding to the light intensity incident on the area indicated by the cross-hatched rectangle, it is found by means of formula (1) that the focusing-error signal $S_f$ is $$S_f = \frac{E_{r0, t0}}{I_0} \quad (5)$$

By varying the position of the objective system relative to the record carrier the control system will now correct the focusing-error signal $S_f$ until $S_f$ is zero. However, as a result of this the objective system is now "out of focus".

In accordance with the invention the electronic circuit 10 comprises means for deriving a control signal (or focusing-error signal) $S_f'$ which satisfies the formula $$S_f' = \alpha \left[ \frac{S_1 - S_4}{S_1 + S_4} + \frac{S_3 - S_2}{S_3 + S_2} \right] \quad (6)$$

from the output signals $D_1$ to $D_m$. In the case of a focusing error it follows from formula (2) that $S_f'$ is $$S_f' = \alpha \frac{2 \delta I}{I_0}$$

so that for $\alpha = 0.5$ the same sensitivity around the "in focus" condition is obtained as in the known apparatus, see formula (3). For the further calculations it has been assumed that $\alpha = 0.5$.

In the case of an offset of the light spot as indicated in FIG. 3b, it follows from formula (4) that $S_f'$ is:

$$S_f' = \frac{E_{r0, t0} - \frac{E_{r0} \cdot E_{t0}}{I_0}}{I_0 \left[ 1 - \left( \frac{E_{t0}}{I_0} \right)^2 \right]} \quad (8)$$

When it is assumed that the offset in the direction Y-axis is small then $$\left( \frac{E_{t0}}{I_0} \right)^2$$

remains negligible relative to 1, so that formula (8) may be simplified to $$S_f' = \frac{E_{r0, t0}}{I_0} - \frac{E_{r0} \cdot E_{t0}}{I_0^2} \quad (9)$$

The value for $S_f'$ in accordance with formula (9) is substantially smaller than the value for $S_f$ in accordance with formula (5) as will be apparent from the following. If it is assumed that when "in focus", the spot may be regarded as a circular spot having a radius r within which the light intensity is constant and equal to $i_0$, then this yields:

$$I_0 = \frac{\pi}{4} r^2 i_0 \quad (10)$$
$$E_{r0} = r_0 \cdot r \cdot i_0$$
$$E_{t0} = t_0 \cdot r \cdot i_0$$
$$E_{r0, t0} = t_0 \cdot r_0 \cdot i_0$$

so that inserting formulas (10) in formulas (5) and (9) yields:

$$S_f' = - \frac{1}{3 \cdot 66} S_f$$

The offset error in the focusing-error detection signal $S_f$ can thus be reduced by a factor 3.66 by the use of formula (6) instead of formula (1).

Preferably, the detector pairs, i.e. the pair of detectors $D_1$ and $D_4$ and pair of detectors $D_2$ and $D_3$, must be selected in such a way that the axis disposed between the pairs (i.e. the X-axis in FIG. 3) of the system of axes corresponds to the direction of anticipated maximum offset of the light spot over the detector means. This follows from the fact that for reducing formula (8) to formula (9), it has been assumed that the offset in the direction of Y-axis is small, which means that the offset in the direction of the X-axis may be larger.

In an apparatus in accordance with the invention comprising positioning means (not shown) for positioning the light beam on the record carrier, which means comprise a first pivotal mirror (not shown) for radial tracking and a second pivotal mirror (not shown) for tangential tracking, this direction of the anticipated maximum offset corresponds to the direction of the shift of the light beam caused by tilting the mirror which is disposed farther from the objective system. In the commercially available Philps Laser Vision Players this is the radial tracking mirror.

FIG. 4 shows schematically an example of the means 20 for deriving a control signal $S_f$ in conformity with formula (6). Via input 21, the output of the detector $D_1$ is coupled to the non-inverting inputs of a first and a second signal-combination unit 25 and 26, respectively. Via the input 22, the output of the detector $D_4$ is coupled to an inverting input of the signal-combination unit 25 and to a non-inverting input of the signal-combination unit 26. Via the input 24, the output of the detector D₃ is coupled to the non-inverting inputs of a third and a fourth signal combination units 27 and 28, respectively. Via the input 23, the output of the detector D₂ is coupled to the inverting input of the signal-combination unit 27 and to the non-inverting input of the signal-combination unit 28. The outputs of the signal-combination units 25 and 26 are coupled to a first and a second input 30 and 31, respectively, of a first divider 32. The outputs of the signal-combination units 27 and 28 are coupled to a first and a second input 33 and 34, respectively, of a second divider 35. The outputs 36 and 37 of the dividers 32 and 35, respectively, are each coupled to a non-inverting input of a fifth signal combination unit 38, whose output is coupled to the output 39 of the means 20 for supplying the control signal $S_f$ in conformity with formula (6). The multiplication by the factor $\alpha$ may be effected, for example, in the signal-combination unit 38. In that case the signal combination units 26 and 28 merely have to perform an addition and the signal-combination units 25 and 27 a subtraction.

Figure 5:
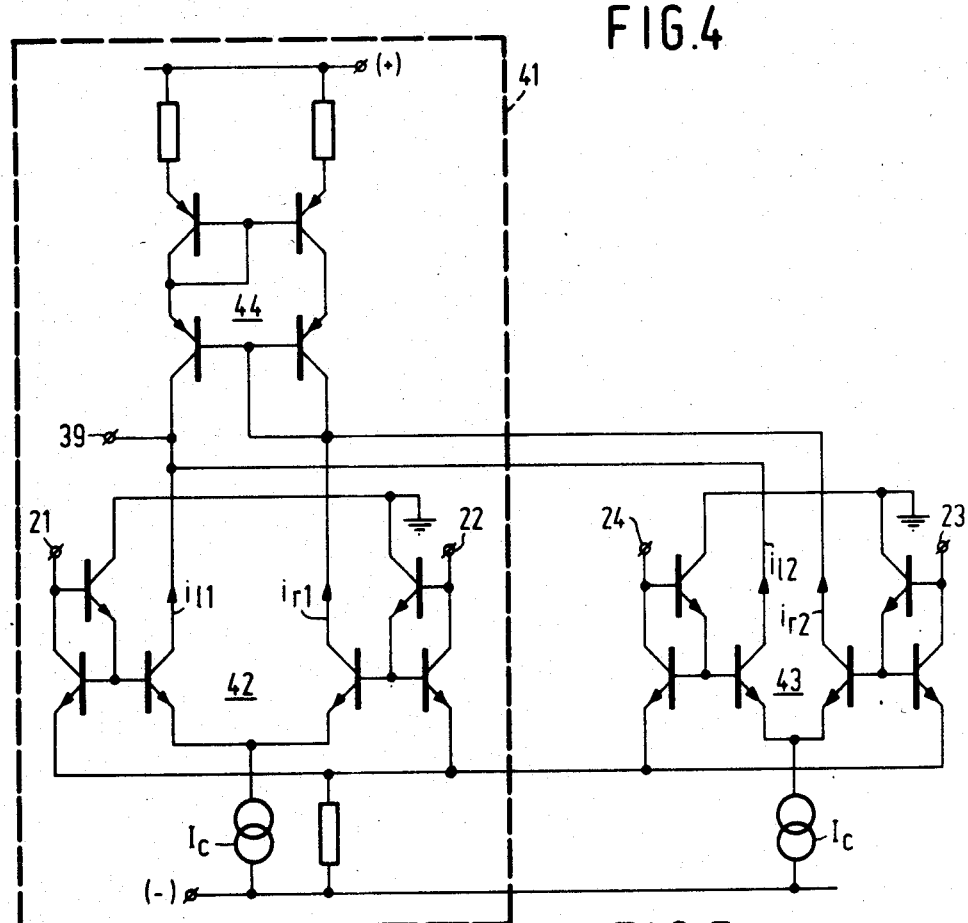
FIG. 5 shows a second example of the means for deriving a control signal.

FIG. 5 shows another example of the means 20' for deriving the control signal $S_f$ in conformity with formula (6) in more detail. The section bearing the reference numeral 41 corresponds to FIG. 7 of Netherlands Patent Application No. 82.00.208 which corresponds to U.S. Pat. No. 4,446,545, i.e. to the left-hand part bearing the reference numeral 30 in the latter Figure. In said patent this section is used for producing the control signal $S_f$ in conformity with formula (1) on the output 39. With the extension shown in FIG. 5, section 41 can also be used for deriving the control signal $S_f$ in conformity with formula (6).

The output signals $S_1$ and $S_4$ of the detectors $D_1$ and $D_4$, respectively are applied to the inputs 21 and 22, respectively. The currents $i_{l1}$ and $i_{r1}$ in the left-hand and the right-hand branch, respectively, of the differential amplifier 42 are then equal to $$\frac{S_1}{S_1 + S_4} I_c \text{ and } \frac{S_4}{S_1 + S_4} I_c,$$

respectively. The output signals $S_2$ and $S_3$ of the detectors $D_2$ and $D_3$, respectively are applied to the inputs 23 and 24, respectively. The currents $i_{l2}$ and $i_{r2}$ in the left-hand and the right-hand branch, respectively, of the differential amplifier 43 are then equal to $$\frac{S_3}{S_2 + S_3} I_c \text{ and } \frac{S_2}{S_2 + S_3} I_c,$$

respectively. Owing to the presence of the current-mirror circuit 44, this yields a signal which is equal to:

$$\left( \frac{S_1 - S_4}{S_1 + S_4} + \frac{S_3 - S_2}{S_2 + S_3} \right) I_c$$

on the output 39. If the currents from the current sources $I_c$ are both equal to $\alpha$, the control signal $S_f$ on output 39 will be exactly in conformity with formula (6).

It is to be noted that the invention is not limited to the embodiments shown in the Figures. The invention also relates to those apparatuses which differ from the embodiments shown with respect to points which do not affect the inventive idea. Although the invention has been described for an apparatus for reading information it is obvious that the invention may also be applied to apparatuses for recording information, because the description relates to the reflecting function of the record carrier both during recording and during reading.

What is claimed is:

1. An apparatus for recording and/or reading information in or from a track on a radiation reflecting record carrier, said apparatus comprising means for producing a beam of radiation, means for focusing said beam to a spot on the record carrier in dependence on a control signal, a focus error detection system, means for directing a beam of radiation reflected from the carrier onto said detection system, said detection system including four radiation sensitive detectors each supplying an output signal and an astigmatic element disposed in the path of said reflected radiation between said detectors and the record carrier, each of said detectors being disposed in a quadrant formed by a pair of orthogonal axes which extend at an angle of substantially 45° with respect to astigmatic focal lines of said astigmatic element, and means for deriving said control signal from said output signals, said deriving means having an input which is coupled to said detector means for receiving said output signals and an output for supplying a signal, $S_f$, which defines said control signal and satisfies the formula:

$$S_f = \alpha \left[ \frac{S_1 - S_4}{S_1 + S_4} + \frac{S_3 - S_2}{S_3 + S_2} \right]$$

where $S_1$, $S_2$, $S_3$ and $S_4$ are output signals of consecutive detectors taken in the clockwise sense and $\alpha$ is a constant.

2. An apparatus as claimed in claim 1, wherein $\alpha$ is 0.5.

3. An apparatus as claimed in claim 1, wherein said detectors form two pairs of detectors such that the axis of the system of axes which extends between the pairs correspond to the direction of the anticipated maximum offset of the reflected light beam which is incident on the detector means.

4. An apparatus as claimed in claim 1, wherein the pair of detectors supplying output signals $S_1$ and $S_4$ and the pair of detectors supplying the output signals $S_2$ and $S_3$ are selected so that the axis which extends between said pairs of detectors corresponds to the direction of anticipated maximum offset of said beam of reflected radiation.

5. An apparatus as claimed in claim 4, wherein the record carrier is a disc and comprising positioning means for positioning the radiation beam on the record carrier, which positioning means comprise a first pivotal mirror for radial tracking and a second pivotal mirror for tangential tracking, and wherein said focusing means includes an objective system and the direction of the anticipated maximum offset of the reflected beam corresponds to the direction of the beam offset caused by tilting of that mirror which is disposed farther from the objective system.

6. In an optical recording or playback apparatus having means for producing a beam of radiation, means for focusing said beam to a spot on a reflecting record carrier, a focus error detection system, and means for directing radiation reflected from the record carrier onto said detection system, wherein said detection system comprises four radiation sensitive detectors each supplying an output signal, an astigmatic element disposed in the path of said reflected radiation between said detectors and the record carrier, each of said detectors being disposed in a quadrant formed by a pair of orthogonal axes which extend at an angle of substantially 45° with respect to astigmatic focal lines of said astigmatic element, and means for generating a focus error signal from said output signals, the improvement wherein said generating means comprises first means for deriving, from a first pair of output signals from a first pair of detectors which are disposed in two adjacent quadrants, a first signal representative of the quotient of the difference between the output signals of said first pair and the sum of said output signals of said first pair, second means for deriving, from a second pair of output signals from a second pair of detectors which are disposed in the other two, adjacent quadrants, a second signal representative of the quotient of the difference between the output signals of said second pair and the sum of said output signals of said second pair, and third means for deriving, from said first and second signals, a third signal representative of the sum of said first and second signals, said third signal defining said focus error signal.

7. An apparatus as claimed in claim 6, wherein said first and second deriving means each includes means for subtracting the respective output signals so as to obtain a difference signal representative of the difference therebetween, means for adding the respective output signals to obtain a sum signal representative of the sum thereof and means for dividing the respective difference signal by the respective sum signal so as to obtain said first and second signals, respectively, and said third means includes means for adding said first and second signals.

* * * * *